United States Patent [19]

Borst et al.

[11] Patent Number: 4,475,881
[45] Date of Patent: Oct. 9, 1984

[54] THERMOFORMING OF PLASTIC SHEET MATERIAL

[75] Inventors: Rodney D. Borst, Oregon; Daniel C. Herr, Waunakee, both of Wis.

[73] Assignee: Placon Corporation, Madison, Wis.

[21] Appl. No.: 418,087

[22] Filed: Sep. 14, 1982

[51] Int. Cl.³ ............................................. B29C 17/02
[52] U.S. Cl. .............................. 425/397; 425/324.1; 425/342.1; 425/343; 425/384; 425/388
[58] Field of Search .................... 425/384, 387.1, 388, 425/397, 324.1, 340, 342.1, 343; 264/544, 550, 551, 553, 554

[56] References Cited

U.S. PATENT DOCUMENTS

| | | |
|---|---|---|
| 711,840 | 10/1902 | Fernald . |
| 1,574,564 | 2/1926 | Farnsworth ..................... 425/293 |
| 1,651,744 | 12/1927 | Van Derhoef . |
| 1,904,268 | 4/1933 | Bronson . |
| 2,240,274 | 4/1941 | Wade . |
| 2,414,177 | 1/1947 | Smith . |
| 2,502,772 | 4/1950 | Winstead . |
| 3,051,361 | 8/1962 | Menkel . |
| 3,119,534 | 1/1964 | Lehnert . |
| 3,227,346 | 1/1966 | O'Brien . |
| 3,240,851 | 3/1966 | Scalora . |
| 3,277,224 | 10/1966 | Whiteford ..................... 425/388 X |
| 3,321,561 | 5/1967 | Brown .............................. 264/544 |
| 3,419,937 | 1/1969 | Bally . |
| 3,484,839 | 12/1969 | Neumann ........................... 264/168 |
| 3,551,546 | 12/1970 | Gosper ................................ 264/178 |
| 3,748,078 | 7/1973 | Schott .................................. 425/383 |
| 3,762,322 | 10/1973 | Vines . |
| 3,791,567 | 2/1974 | Schott .................................. 226/112 |
| 3,837,782 | 9/1974 | Meissner et al. . |
| 3,854,861 | 12/1974 | Worrall ................................. 425/504 |
| 4,043,736 | 8/1977 | Andres et al. . |
| 4,196,164 | 4/1980 | Ward .................................. 264/553 X |
| 4,289,470 | 9/1981 | Johnston et al. . |

FOREIGN PATENT DOCUMENTS

| | | |
|---|---|---|
| 56-44627 | 4/1981 | Japan ................................. 264/544 |
| 147298 | 8/1931 | Switzerland . |
| 1158593 | 7/1969 | United Kingdom . |
| 1217257 | 12/1970 | United Kingdom . |
| 1275760 | 5/1972 | United Kingdom . |
| 1459769 | 12/1976 | United Kingdom . |
| 1514738 | 6/1978 | United Kingdom . |
| 2040792 | 9/1980 | United Kingdom . |

OTHER PUBLICATIONS

"Thermoforming", Modern Plastics Encyclopedia 1980-1981 pp. 406-414.
"Brown Thermoforming Equipment", brochure published by Brown Machine Division, Koehring Company.
"Sentinel 2500", brochure published by Packaging Industries, Inc.
"Continuous Thermoforming Systems", brochure published by Brown, A Leesona Company.
"Model 42P Pressure and Vacuum Forming Machine", brochure published by Brown Machine Company.

Primary Examiner—Jan Silbaugh
Attorney, Agent, or Firm—Isaksen, Lathrop, Esch, Hart & Clark

[57] ABSTRACT

A method and apparatus are disclosed for holding and feeding a continuous sheet (12) of plastic in an operation such as thermoforming. Articulations (13), such as alternating waveforms, are formed on the edges of the plastic sheet (12) by heating and pressing the edges, producing inwardly facing abutment surface at the edges of the sheet. The sheet is then passed into slots (34) in guide rails (32) with the inside surfaces (35) of the guide rails (32) engaging the abutment surfaces on the plastic sheet (12) to prevent the sheet from slipping out of the guide rails. The plastic sheet is thereby held firmly so that it can be passed through such thermoforming operations as heating in an oven (14), forming with a mold at a forming station (40), and cutting the formed articles away from the remainder of the sheet by a trim press (53). The sheet is advanced in increments through the thermoforming apparatus by a sheet advance mechanism (48) which alternately grasps the sheet to advance it and then releases the sheet while the forming and trimming operations are carried out. Sheet stretching guide rails (90) hold the sheet at the mold and are mounted to move outwardly to stretch the heated sheet as the mold engages the sheet. The stretch on the sheet is released as the mold disengages. The stretching of the sheet during forming compensates for the tendency of the formed sheet to shrink as it cools.

5 Claims, 15 Drawing Figures

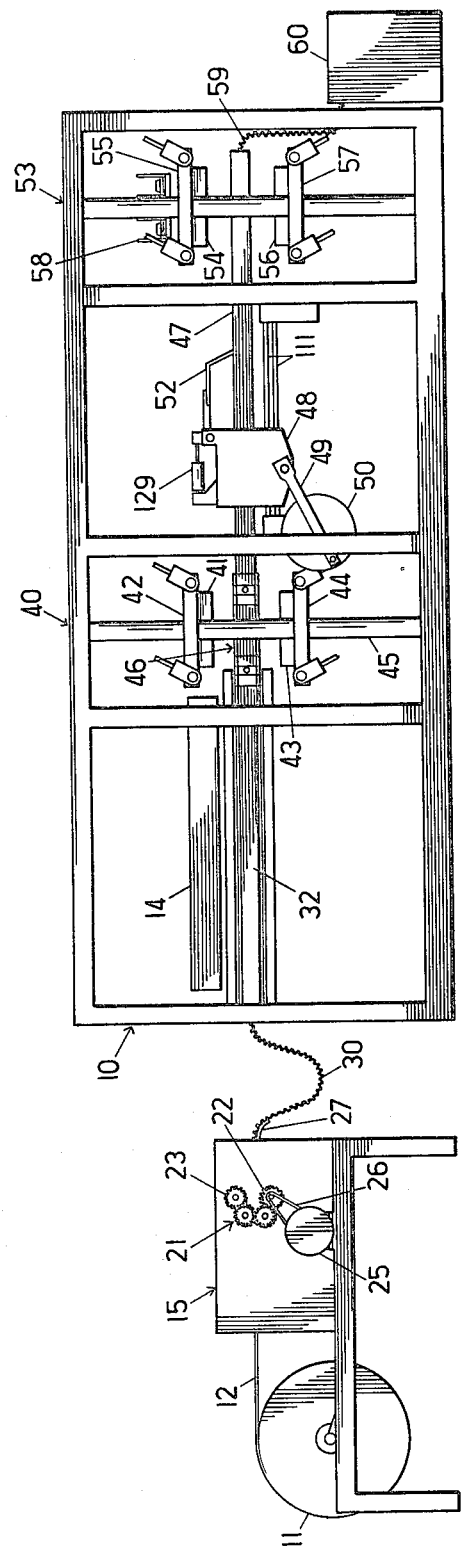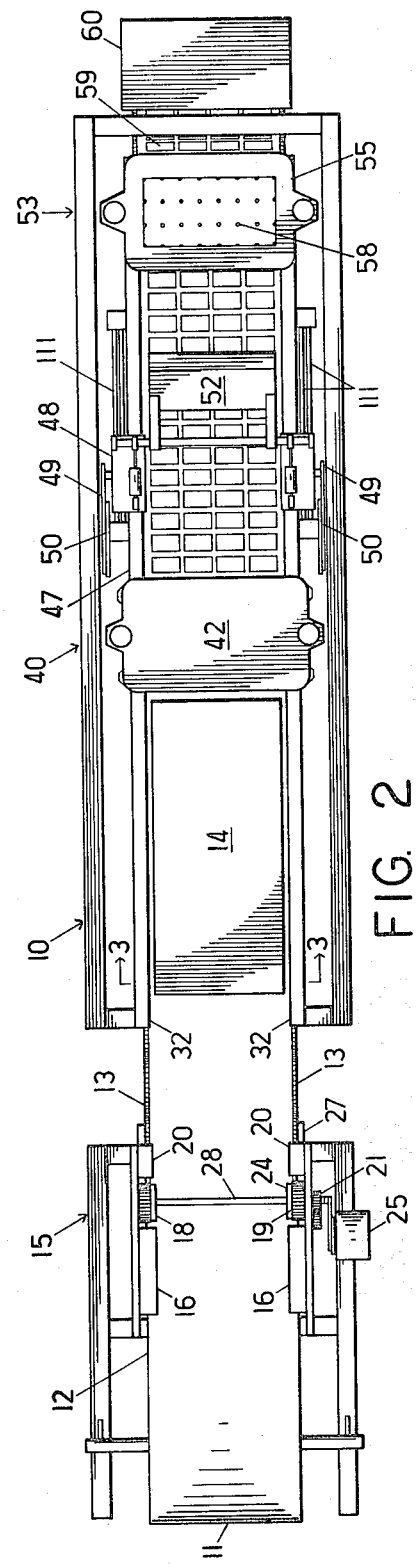

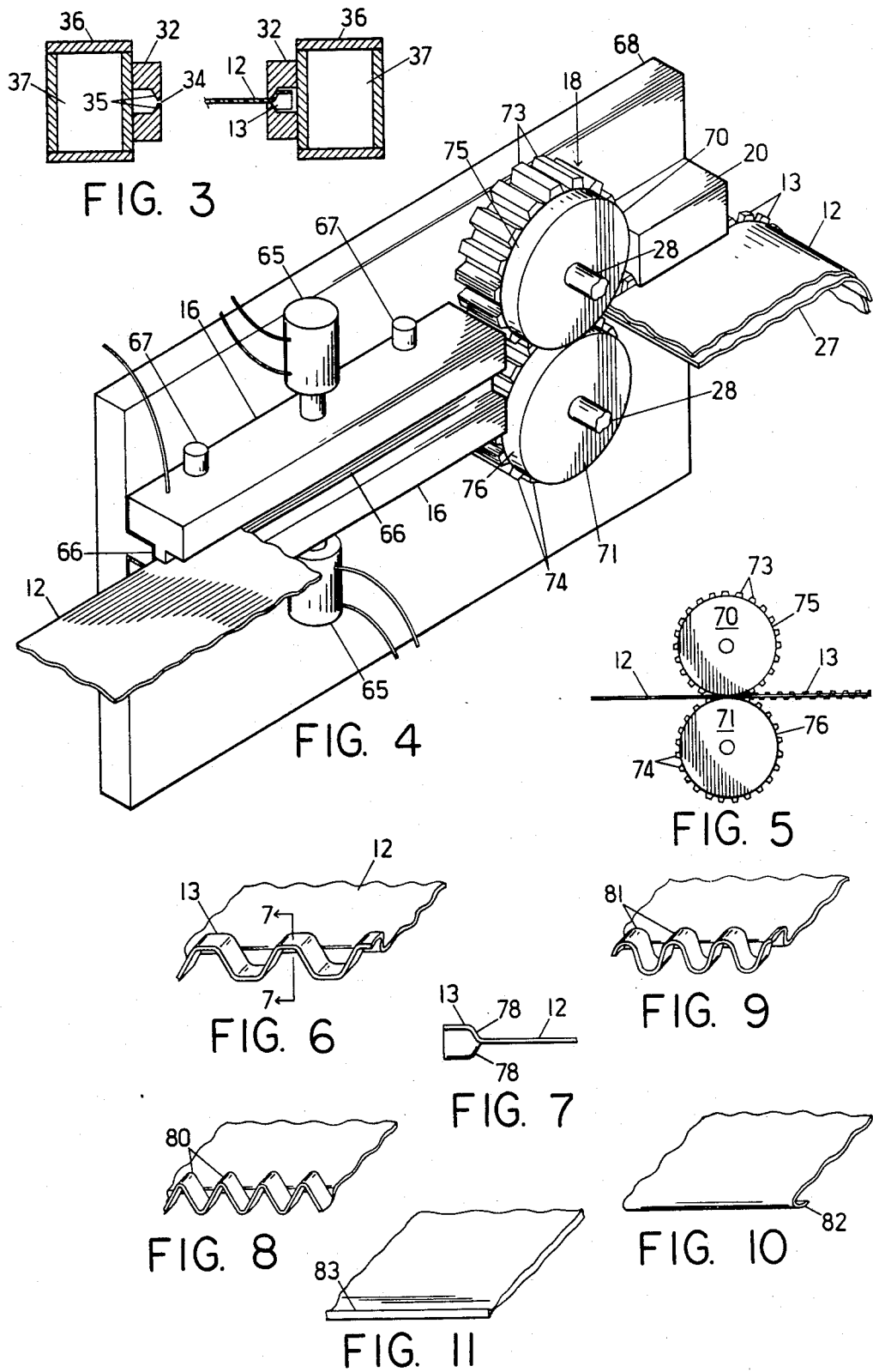

THERMOFORMING OF PLASTIC SHEET MATERIAL

TECHNICAL FIELD

This invention generally relates to the field of machines which thermoform plastic sheet material into various products, and particularly to the mechanisms by which the plastic sheet material is fed through such machines.

BACKGROUND ART

The thermoforming process is widely used in the packaging industry to make various products from sheets of thermoplastic material. The plastic is fed through the machines, either continuously from a roll or in cut sheets, and is subsequently heated, to allow forming of the plastic, shaped in molds to produce the shapes of the various desired parts, and cooled and trimmed to separate the parts from the surrounding scrap sheet. The remaining portion of the sheet from which the parts have been cut—commonly called a skeleton—is waste material and is discarded or is sold as scrap plastic. In some applications, such as where the plastic sheet is pre-printed or where the sheet comprises a laminate of two or more base sheets of plastic, the skeleton cannot be reclaimed and must be discarded.

Thermoforming equipment typically includes an oven or heating station, in which the sheet material is heated to a softened state, a forming station in which the heated plastic is formed by molds into the desired shapes, and a trim station where the formed parts are cut. The standard apparatus for carrying the material through these various stations includes either endless chains with projecting spikes, or mechanical clamps carried on endless chains. The typical spiked chains are mounted along the lateral edges of the incoming sheet and the spikes engage the sheet and puncture it to provide a mechanical connection between the edges of the sheet and the chains. The spikes carry the sheet forwardly as the chains move and also provide lateral support for the sheet when the sheet is formed in the mold, an operation which tends to pull in the edges of the sheet. In order to insure that the spikes do not pull through the sheet when lateral tension is placed upon it, the spikes are typically spaced one-quarter to one-half inch inwardly from the edges of the sheet. Only the portion of the sheet inwardly of the spiked chains and the guides for the chains can be thermoformed, and the outer edge portions are left as waste plastic after the thermoforming process is completed. The wasted edge portion on each side of the sheet is typically three quarters to one inch wide.

In addition to the relatively large amount of waste material that is generated when using spiked chains to carry the plastic sheet through the thermoforming equipment, other disadvantages of this type of conveyance have also been noted. The physical puncturing of the plastic sheet by the spikes creates a small amount of particulate plastic which can create problems where extreme cleanliness must be observed, such as in medical packaging applications, and clamp type holders or mating clamping chains may have to be used in such situations. Such clamp type holders and clamping chains also cover a substantial portion of the sheet which cannot be thermoformed. The endless chains which carry the spikes or clamps naturally have a certain amount of tolerance in each link which increases with wear; and the accumulation of the tolerances in each link, over the long length of the continuous chain, results in a loss of precise registration of the plastic sheet as it passes through the machine. The chains, because of their inertia, also can tend to overshoot the intended stopping point when the chain drive is halted, so that the formed plastic articles may not precisely coincide with the cutting edges in the trim press. Such inertial effects additionally tend to limit the speed of operation of the machine. Because the chains are subject to mechanical stresses during the repeated stopping and starting motions, and because they are subjected to heating and cooling as they pass through the equipment, they require periodic maintenance and replacement.

An improved manner of conveying plastic sheet through a thermoforming machine so as to minimize the portion of the sheet which is wasted is disclosed in copending application Ser. No. 345,526, filed Feb. 2, 1981, now abandoned. The edges of a plastic sheet to be thermoformed are articulated so as to provide inwardly facing abutment surfaces at the edges of the sheet. The articulated edges of the sheet are then inserted into slots in guide rails which extend through the thermoforming machine. The slot in each guide rail is slightly larger than the thickness of the sheet, and the slot opens onto a cavity within the guide rail which has engagement surfaces extending away from the slot. The abutment surfaces on the sheet edge mate with the engagement surfaces within the guide rails to prevent the sheet from slipping out, thus providing lateral support and longitudinal guiding of the sheet.

The sheet, while held at its edges by the guiderails, is sequentially heated and softened, advanced to a forming station where mold portions engage and form the softened plastic, and then advanced to a trim station where the formed parts are cut from the remainder of the sheet. It has been found that the plastic sheet material has a natural tendency to shrink as it is cooled in the mold and as it cools in the air after it exits from the mold. Such shrinkage may cause the sheet to be pulled excessively against the internal walls in the guide rails, resulting in excessive frictional drag when the sheet is advanced.

DISCLOSURE OF THE INVENTION

In accordance with the present invention, a plastic sheet having articulated edges is held at such edges by slotted guide rails which extend through the heating station, forming station, and trim station of the machine. After a portion of the plastic sheet is heated, it is drawn into the forming section where an upper mold portion is positioned to descend toward a lower mold portion. The guide rails holding the heated portion of the sheet terminate at the position of the mold portions and allow the edges of the plastic sheet to engage with sheet stretching guide rails which extend over the width of the mold portions. The sheet stretcher guide rail portions are adapted to move outwardly a short distance as the mold portions are coming together to cause the heated sheet to be stretched outwardly at the time that the mold portions engage. The stretch on the sheets is released as the mold portions part from one another. The slight stretching of the sheet by the sheet stretcher compensates for the natural tendency of the plastic material to shrink as it is cooled in the mold and as it cools in the air after it exits from the mold. When the stretched sheet cools and shrinks, its width will be substantially equal to the width of the sheet before forming, allowing the stretched sheet to be advanced into another set of stationary guide rails which hold and guide the sheet through remaining operations with minimal frictional drag.

Further objects, features, and advantages will be apparent from the following detailed description taken in conjunction with the accompanying drawings showing a preferred embodiment of the improved apparatus for thermoforming sheet material in accordance with the invention.

BRIEF DESCRIPTION OF THE DRAWINGS

In the drawings:

FIG. 1 is a simplified side elevation view of a thermoforming machine which incorporates the apparatus of the present invention.

FIG. 2 is a top view of the machine of FIG. 1.

FIG. 3 is a cross-sectional view of the guide rails taken along the line 3—3 of FIG. 2.

FIG. 4 is a perspective view of the portion of the apparatus that provides articulation of the edges of the plastic sheet.

FIG. 5 is a simplified side view of a wave-type crimp being formed in the edge of a plastic sheet by crimping wheels.

FIG. 6 is a view of the articulated edge formed by the crimping wheels of FIG. 5.

FIG. 7 is a cross-sectional view of the articulated edge taken along the line 7—7 of FIG. 6.

FIGS. 8-11 are views of alternative edge articulation configurations formed in plastic sheets.

BEST MODE FOR CARRYING OUT THE INVENTION

Figure 12:
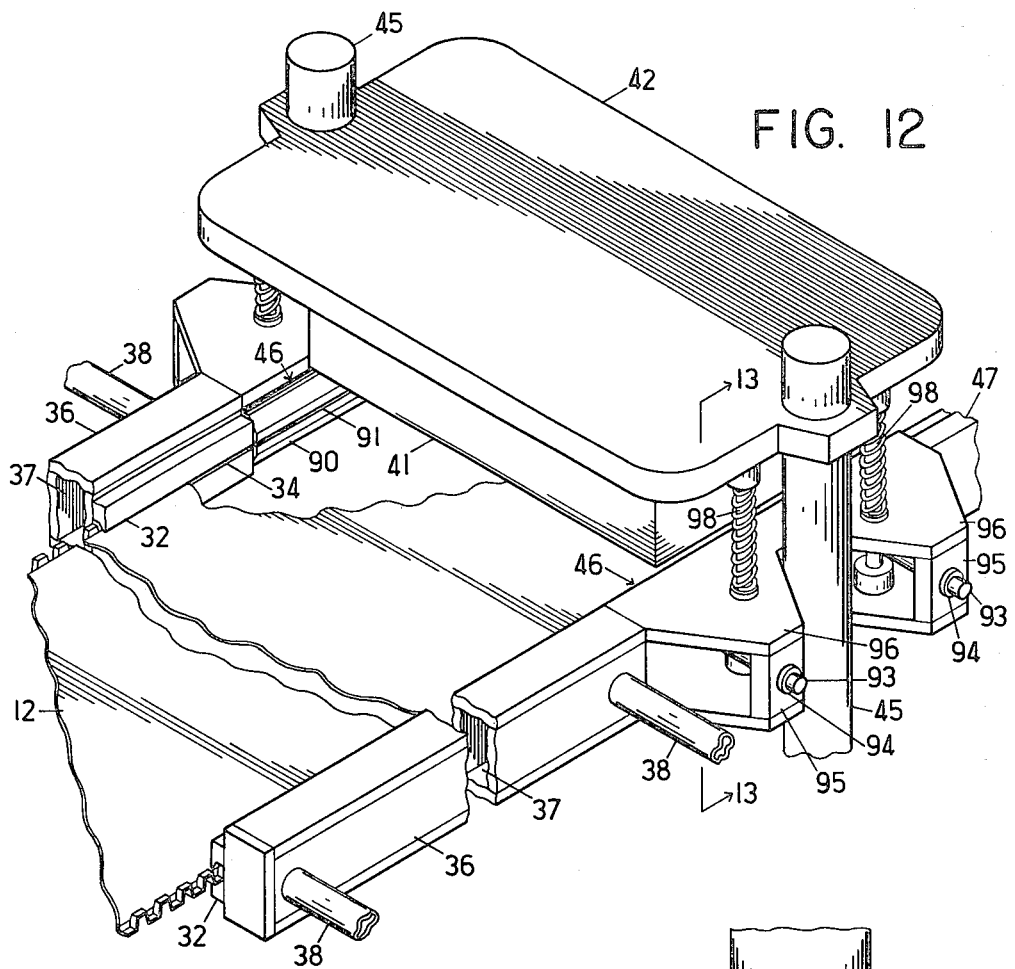
FIG. 12 is an isometric perspective view generally showing the forming section of the apparatus including portions of the guide rails which are adapted to stretch the sheet during forming.

With reference to the drawings, a thermoforming machine incorporating the apparatus of the invention is shown generally at 10 in FIGS. 1 and 2. In the particular machine shown, the plastic is provided on a roll 11 and comes off in a continuous sheet or web 12. As is apparent to those skilled in the art, cut sheets of plastic can also be provided and can be fed through the apparatus in accordance with the present invention. The sheet 12 may be composed of any of the various materials that are commonly used in thermoforming, such as polystyrene, expanded or foamed polystyrene, ABS, polyvinyl chloride, high density polyethylene, polypropylene, and polyester.

In contrast to standard thermoforming equipment, in which the plastic from the roll is fed directly into the oven section 14 of the machine 10, the plastic sheet 12 is first passed through an edge articulation section 15 which produces raised articulations 13 with inwardly facing abutment surfaces along the edges of the sheet. As explained in further detail below, the edges of the sheet may first be heated by edge heaters 16 to soften the plastic and are then pressed between pairs of crimping wheels 18 and 19 to form the articulation in the edges. After the sheet passes through the pairs of crimping wheels, the articulated edges of the sheet, which cool and harden rapidly as they pass through and out of the crimping wheels, are received by guide rails 20 mounted immediately adjacent the pairs of crimping wheels 18 and 19. The guide rails 20 serve to stabilize the sheet coming from the crimping wheels so that the sheet does not drift laterally. The two crimping wheels in the pair 19 are driven in synchrony by a gear train 21. One gear 22 in the train is mounted to rotate with the lower wheel (not shown in FIG. 2) of the pair 19, while another gear 23 in the train is mounted to rotate with the upper wheel 24. The gear train allows the crimping wheels in each pair to be moved closer together or farther apart to accommodate sheets of varying thicknesses. Power to drive the gear 22 is provided from an electric motor 25 through a drive belt 26. The upper and lower crimping wheels in the pair 18 are connected by shafts 28 to the upper and lower wheels in the pair 19 so that all of the crimping wheels are driven synchronously.

After exiting from the guide rails 20, the sheet passes from a curved support plate 27 and hangs in a loop, denoted at 30, which allows for different rates of movement of the sheet between the articulation section 15, wherein the sheet moves continuously, and the remainder of the thermoforming machine 10, wherein the sheet moves periodically. The motor 25 may also be controlled to speed up or slow down depending on the position of the loop 30.

The articulated sheet 12 passes first into the oven 14, which may be of any of the designs which are well known in the art. As a portion of the sheet enters the oven area it is engaged and carried at its edges by guide rails 32. The guide rails 32 are best shown in the cross-sectional view of FIG. 3. The sheet 12 extends through slots 34 in the guide rails which are slightly wider than the thickness of the sheet, and each guide rail 32 has an inner cavity defined by internal walls including engagement walls 35, extending away from the slot, which engage with the abutment surfaces on the articulated edges 13 of the sheet to prevent the sheet from slipping out.

The first set of guide rails 20, mounted adjacent to the pairs of crimping wheels 18 and 19, are formed similarly to the guide rails 32.

The oven 14 which applies heat to the plastic sheet also applies heat to the guide rails 32. To dissipate this heat, the guide rails are mounted on heat transfer members 36 having internal channels 37 which are supplied with circulating water from hoses 38, as shown in FIG. 12, to continuously cool the guide rails.

After the plastic sheet is heated it is drawn into a forming section 40 of the machine wherein, for illustrative purposes, an upper mold portion 41 mounted on a platen 42 is positioned to descend toward a lower mold portion 43 mounted on a platen 44, with the platens 42 and 44 being mounted on vertical guide rods 45. The guide rails 32 preferably terminate at the position of the mold portions 41 and 43 and allow the edges of the plastic sheet to engage with sheet stretching guide rail assemblies 46 which extend over the width of the mold portions 41 and 43. As described in further detail below, the sheet stretcher guide rail portions 46 are adapted to draw the sheet outwardly a short distance as the mold portions 41 and 43 are coming together to cause the heated sheet to be stretched at the time that the mold portions engage. The stretch on the sheets is released after the mold portions part from one another. The purpose of the sheet stretcher is to compensate for the natural tendency of the plastic sheet to shrink as it is cooled in the mold and as it cools in the air after it exits from the mold, which might cause the sheet to be pulled excessively against the internal walls in the guide rail were the sheet not stretched before molding, thus causing excessive frictional drag when the sheet is advanced.

After the portion of the sheet with articles formed therein advances out of the forming section 40 it again is engaged at its edges by additional stationary guide rails 47 which may extend the remainder of the length of the machine. A sheet advancer 48 is mounted to reciprocate over the guide rails 47. The sheet advancer grasps a sheet at its position shown in FIG. 1, advances the sheet forwardly, releases the grip on the sheet, and then reciprocates back to its initial position. The sheet advancer is driven by connecting rods 49 which are pivotally attached at their other ends to rotating cranks 50. The cranks 50 are rotated a single rotation at a time by a stepping drive motor (not shown).

As also illustrated in FIGS. 1 and 2, the sheet advancer 48 may also include a movable pusher arm or plate 52 which will engage with an article or articles formed in the plastic sheet and push these articles forward, thereby drawing the sheet with them, to provide precise registration of the formed articles within a trim station 53. Within this station, an upper trim die 54 mounted to a platen 55 is shown in position to descend and mate with a lower trim die 56 mounted to a lower platen 57 to cut the formed parts from the sheet. The severed parts are illustratively shown stacked in a rack 58, while the remaining skeleton portion 59 of the web passes downwardly into a collector 60 for disposal or regrinding. For maximum compactness in operation, a grinder could be utilized at the position 60 to immediately grind up the remaining portion 59 of the plastic web. Of course, the trim operation may be performed at the forming station without moving the web, as is done on some types of commercial machines, eliminating the need for precise advancement of formed articles in the web.

It will be appreciated from the foregoing description that the movement of the plastic sheet through the machine is accomplished smoothly without the need to puncture the plastic web in order to advance the web or provide lateral support for it.

The oven section 14, the forming station 40, and the trim station 53 of the thermoforming machine are standard commercial units and do not need to be modified in order to allow the use of the above described technique for feeding the plastic web through these sections. Examples of commercial machines having such equipment include those produced by Brown Machine Co., Beaverton, Mich., Irwin Research Corp., Yakima, Wash., and Packaging Industries, Inc., Hyannis, Mass. See also, "Thermoforming," Modern Plastics Encyclopedia 1980-81, pp. 406-414.

A more detailed view of the edge articulation former is shown in perspective in FIG. 4, illustrating the portion of the apparatus for forming an articulated edge on one side of the plastic sheet, it being understood that the apparatus to form the articulated edge on the other side of the sheet is identical, although the mirror image.

The edge of the web 12 passes between a pair of metal heater blocks 16 which act as the edge heaters. These blocks are internally heated by electric resistance heating elements (not shown) buried within them, with the temperature being controlled in a conventional manner through the use of a thermistor and a standard automatic temperature controller (not shown).

The heater blocks 16 are advanced toward and withdrawn away from the edges of the plastic sheet 12 by air pressure operated drive cylinders 65. The heater blocks remain withdrawn away from the sheet until the sheet is ready to be advanced, at which time the blocks are moved inwardly to engage the sheet as it begins moving. The heater blocks 16 preferably have a ridge 66 formed adjacent the edge of the sheet, and the flat top surfaces of the ridges are the portions of the heater blocks that actually contact the plastic. The blocks 16 are mounted for sliding up and down movement on posts 67 attached to a mounting plate 68.

The softened edges of the plastic sheet are then passed between the pairs of crimping wheels 18 and 19. The two crimping wheels 70 and 71 which form the pair 18 are shown in a side elevation view in FIG. 5. The crimping wheel 70 has forming teeth 73, similar to gear teeth, formed over a portion of its width which mesh with forming teeth 74 formed over a portion of the width of the crimping wheel 71. In addition, the wheel 70 has a smooth surfaced sheet engaging friction roller 75 which is coaxial with the gear teeth on the wheel, and the wheel 71 has a similar coaxial, smooth surfaced sheet engaging roller 76. The elevation of the surface of the sheet engaging rollers 75 and 76 is about half way between the bottom and the top of the gear teeth on each of the wheels 70 and 71 so that at the point of tangency between the two wheels, the surfaces of the rollers 75 and 76 very nearly meet and are spaced apart a distance such that they will squeeze the sheet 12 between them. The relative position of the surfaces of the rollers 75 and 76 is also shown in the side view of FIG. 5. The sheet engaging surfaces of the rollers 75 and 76 serve a dual purpose: they draw the sheet 12 forwardly by virtue of the frictional pull that they exert on the sheet, so that the teeth on the wheels do not exert the primary draw on the plastic; and the tangent surfaces of the rollers 75 and 76 also clamp the sheet tightly in position as it is being engaged at its edges by the teeth 73 and 74 so that a relatively sharp crease is formed in the sheet to provide the inwardly facing abutment surfaces.

The articulations 13 can be formed in different patterns, the primary requisite being that an inwardly facing abutment surface be provided at the edge of the sheet which can hold the sheet laterally when engaged against the internal surfaces of the guide rails. The characteristic wave pattern of articulations 13 formed by the forming teeth 73 and 74 is shown in FIG. 6. The cross-sectional view of FIG. 7 shows the inwardly facing abutment surfaces 78 which rise above the flat surface of the sheet 12. Examples of alternative articulation styles are shown at 80 in FIG. 8, an alternating triangle pattern; at 81 in FIG. 9, an alternating pattern of semicircles; and at 82 in FIG. 10, which comprises a rolled edge wherein the edge of the sheet is formed over into a semicircle along the length of the sheet with the inwardly facing edge providing the abutment surface. The rolled edge can be produced in a conventional manner, as by heating the edge and pulling it through a curved forming horn, die, or wheels. Another edge form is shown at 83 in FIG. 11, in which the sheet is made of a foamed or expanded plastic, so that a crimped or rolled edge may not be feasible. For such material, the required abutment surfaces 83 can be provided by pinching the edges of the sheet with heated plows or wheels to provide permanent grooves on either side of the sheet at the edge which can be engaged with the edges of the slot in the guide rail.

For certain types of relatively thin plastic material, which will undergo plastic deformation without cracking, the heaters 16 may not be needed and the crimping force of the gear teeth will be sufficient to form permanent articulations on the edges of the sheet.

The movable rail assemblies 46 of the present invention which serve to stretch the heated sheet before it is formed are shown in more detail in the perspective view of FIG. 12. Each of the movable sheet stretching rail assemblies 46 is composed of movable guide rail sections 90 which have slots 91 therein formed identically to and normally aligned with the slots 34 in the rails 32 so that the advancing sheet moves continuously from the rails 32 to the rail sections 90, and thence to the additional stationary guide rails 47. As is apparent from FIG. 13, the sheet stretcher rail sections 90 have internal cavities formed therein with engagement walls which are substantially identical to the cavities and engagement walls 35 within the stationary guide rails 32. In the normal position of the sheet stretcher guide rail sections 90, their internal cavities are aligned with the internal cavities in the adjacent stationary guide rails 32. The cavities within the sheet stretcher guide rails 90 are also normally aligned with the internal cavities within the additional stationary guide rails 47.

Figure 13:
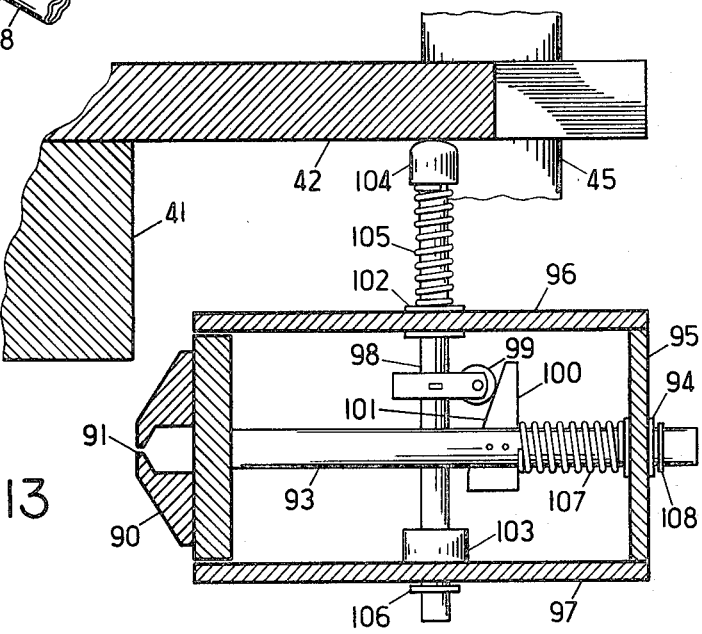
FIG. 13 is a cross-sectional view showing one of the sheet stretcher rails, taken generally along the lines 13—13 of FIG. 12.

The movable rail sections 90 are mounted for in and out movement on shafts 93 which slide in bushings 94 which are themselves firmly mounted to brackets 95 attached to stationary upper frame members 96 and lower support plates 97. The sheet stretcher rail sections 90 preferably pull outwardly just before the mold portions 41 and 43 engage the plastic sheet, and release back inwardly just after the mold portions release the plastic. The movable rails 90 may be driven inwardly and outwardly in various ways, such as through the use of air cylinders, solenoids, or various types of mechanical linkages and drives. To provide positive coordination between the movement of the mold portions and the outward movement of the guide rail sections 90, a mechanical linkage such as is shown in FIG. 13 may be used, wherein the downward motion of the upper mold portion 41 is transmitted through a post 98 to a cam follower 99 mounted on it. The cam follower 99 engages a block 100 which has a slanted cam surface 101 thereon, with the block 100 being rigidly connected to the shaft 93 which extends laterally and connects to the movable guide rail section 90. When the mold portion 41 moves downwardly, it causes the cam follower 99 to push the cam block 100 outwardly, pushing the shaft 93 and thus the movable rail 90 outwardly with it. The post 98, which slides in bushings 102 and 103 mounted to the members 96 and 97, respectively, has a rounded cap 104 at its upper end which is in contact with the bottom of the platen 42. A spring 105 compressed between the cap 104 and the bushing 102 maintains the cap biased against the platen, and a flange 106 on the lower end of the post stops upward motion of the post. A spring 107 pushes on the cam block 100 to drive the movable rail 90 back as the mold portion 41 moves upwardly until inward motion is stopped by a ring member 108 on the shaft 93.

Other mechanisms for stretching the sheet slightly may also be used. For example, the movable rail sections may be mounted on hinges which allow them to pivot slightly outwardly rather than sliding outwardly.

Figure 14:
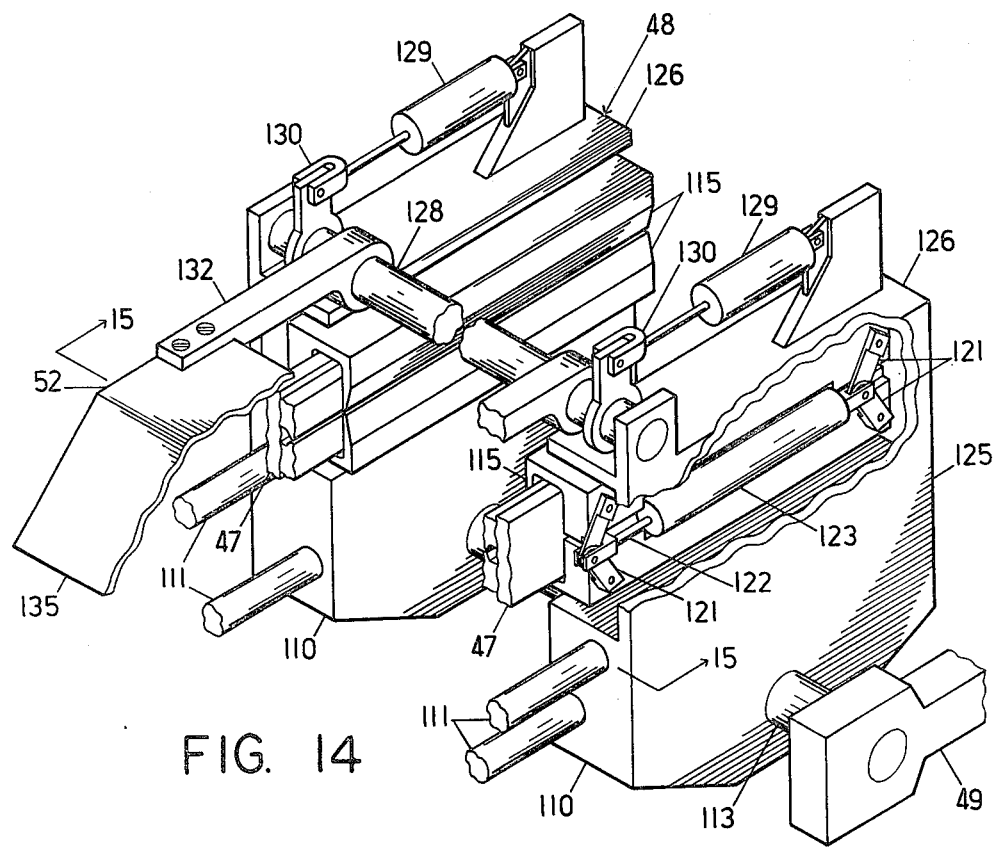
FIG. 14 is a perspective view of the sheet advance mechanism of the apparatus.
Figure 15:
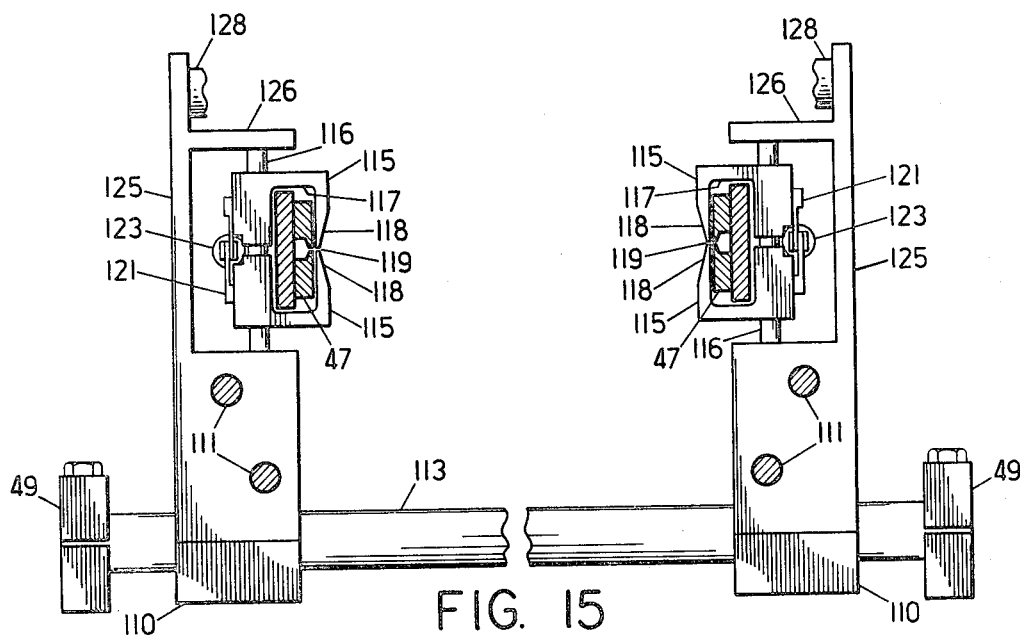
FIG. 15 is a cross-sectional view of the sheet advance mechanism of FIG. 14, taken generally along the lines 15—15 of FIG. 14.

The sheet advancer 48 is shown in a perspective view in FIG. 14. The sheet advancer includes two side blocks 110 which slide back and forth on parallel shafts 111. The sheet advancer is driven by the reciprocating arms 49 which engage a shaft 113 extending all the way between the arms 49 and through the blocks 110.

On each of the blocks 110 are mounted pairs of pinch jaws 115 which ride up and down on posts 116. The pairs of pinch jaws have inner walls 117 which define a cavity through which pass the stationary guide rails 47. Each of the jaws 115 has a thin depending wall 118 which extends over the inner surface of the guide rails 47 and terminates in flat, lengthwise edges which are spaced slightly apart to define a slot 119 through which the sheet of plastic can pass. It is noted that the plastic sheet is provided lateral support by the inner walls of the guide rails 47, and that the pinch jaws 115 provide no lateral support. The jaws 115 close to press the plastic sheet within the slots 119 when the sheet is to be advanced. The compression of the pinch jaws is accomplished as shown in FIG. 14 by toggle linkages 121 pivotally pinned to the upper and lower jaws 115 and connected together by a shaft 122 of a two-way air cylinder 123 which is mounted on the face plate 125 of the side blocks 110. A top plate 126 extends inwardly from the top of each of the side plates 125 and mounts the vertical posts 116 thereto.

The pusher plate 52 is operated in conjunction with the back and forth movement of the sheet advancer 48 by being mounted for rotation on a shaft 128 journaled between the side plates 125. The shaft 128 is rotated by air cylinders 129 whose drive arms are connected to rotate the shaft 128 through clevises and clips 130 rigidly attached to the shaft. The pusher arm plate 52 is connected to the rod 128 by arm members 132. Thus, when the air cylinders 129 retract the clevises and clips 130, the shaft 128 will rotate backwards and the arms 132 and pusher plate 52 will move upwardly. Conversely, when the air cylinders 129 drive the clevises and clips 130 outwardly, the shaft 128 is rotated forwardly and the arms 132 and pusher plate 52 move downwardly.

The movement of the pusher plate is coordinated with the clamping of the jaws 115, providing precise registration of the formed articles in the proper position in the trim press as well as positively and firmly advancing the sheet through the machine. This is preferably accomplished by causing the pusher plate 52 to be retracted upwardly when the sheet advancer 48 is retracted toward its initial position shown in FIG. 1. Upon reaching the fully retracted position, the air cylinders 123 drive the pinch jaws together to clamp the sheet firmly between them. After the drive rod 49 begins to drive the sheet advance unit 48 forwardly, the air cylinders 129 are activated to drive the front edge 135 of the pusher plate 52 downwardly into contact with the sheet between the formed articles. Shortly before the sheet advance unit 48 stops moving forwardly the air cylinders 123 are activated to open the jaws 115, allowing the leading edge 135 of the pusher plate to contact the formed articles and drive the sheet to the precise point of proper registration with the trim die. Just after the article advance unit begins to retract, the pusher plate is drawn back upwardly and the article advance unit 48 then reciprocates back to its starting position to await completion of the forming and trimming operations before beginning the cycle once again. In this manner, the clamping jaws 115 provide most of the force to drive the web forwardly, while the pusher plate drives the web only when it is decelerating. The pusher plate is preferably withdrawn after retraction begins to avoid contact with the formed articles as the plate moves upwardly.

It is apparent that the sheet advancer 48 can be operated such that all of the work of drawing the sheet forwardly can be done by either the pinch jaws 115 or the pusher plate 52 without the aid of the other.

Each new roll of plastic sheet 12 may be manually fed into the guide rails 32 until the leading edge of the sheet reaches the sheet advance unit 48. At that point the heater 14 may be moved into position over the sheet to begin heating and softening the sheet, and the pinch jaws 115 along may be used to advance the sheet until parts formed in the sheet at the forming station 42 advance past the pusher plate 52. The pusher plate may then be operated in coordination with the pinch jaws 115 to advance the sheet in the manner described above. It is apparent that it is also possible to advance the initial portion of the sheet in other ways, such as by utilizing a pair of driven rollers (not shown), positioned between the front ends of the guide rails 32, which would engage the sheet and drive it through the machine until the leading edge of the sheet reached the sheet advancer 48.

Other mechanisms for drawing the plastic sheet through the machine may also be utilized where appropriate. For example, the web skeleton 59 may be pulled by a pair of friction rollers to thereby draw the entire trailing portion of the web. Registration of formed articles can be accomplished by sensing the position of the formed articles with various detectors, such as electric eyes or proximity switches. The articulated edges of the sheet may be used to drive the sheet using a gear drive or toothed drive belts.

It is understood that the invention is not confined to the particular construction and arrangment of parts herein illustrated and described, but embraces such modified forms thereof as come within the scope of the following claims.

What is claimed is:

1. In a thermoforming machine of the type having an oven through which plastic sheet material is passed to soften the plastic, a forming station including mold portions which are adapted to form the softened plastic into a desired shape, stationary guide rails mounted on either side of the path of the plastic sheet which extend through the oven to the forming station, each of the guide rails having a slot therein into which the plastic sheet can pass, the guide rails having walls defining an internal cavity opening on the slot therein and including internal engagement walls extending away from the slot, the internal engagement walls being adapted and positioned to engage with inwardly facing abutment surfaces formed on the edges of the plastic sheet to prevent the sheet from slipping out of the slot in each guide rail, whereby the plastic sheet may be held within the guide rails to prevent substantial lateral movement of the sheet but allow it to move forwardly, and drive means for driving a plastic sheet held within the guide rails forwardly through the machine, the improvement comprising:

(a) sheet stretching guide rails mounted on either side of the path of the plastic sheet over the width of the mold portions, the sheet stretching guide rails being separated from the stationary guide rails and having a slot therein and internal engagement walls which are normally generally aligned with the slots and internal engagement walls in the respective adjacent stationary guide rails such that a plastic sheet with inwardly facing abutment surfaces formed at its edges will be passed between the stationary guide rails and the sheet stretching guide rails;

(b) means for mounting the sheet stretching guide rails for inward and outward movement;

(c) means for moving the sheet stretching guide rails outwardly to outwardly displace the engaged inwardly facing abutment surfaces of the softened plastic sheet to stretch the sheet slightly before engagement of the plastic sheet by the mold portions and for moving the sheet stretching guide rails inwardly after the mold portions release the plastic sheet to a position at least as far inward as the stationary guide rails to permit forward movement of the sheet.

2. The machine of claim 1 wherein the sheet stretching guide rails are mounted for inward and outward movement to shafts which slide in bushings.

3. The machine of claim 2 wherein the means for driving the sheet stretching guide rails inwardly and outwardly include, for each guide rail, a post mounted for sliding movement to a bushing and operatively connected to a mold portion so as to be driven with the mold portion when the mold portion approaches the plastic sheet, a cam block having a cam surface thereon which is attached to a shaft connected to the guide rail, and a cam follower mounted to the post and engaging the cam surface such that movement of the post driven by the mold section will be transmitted through the cam follower and cam block to the shaft connected to the guide rail to drive the same outwardly, and also including means for urging the guide rail back to its normal position when the mold portion moves away from the plastic sheet.

4. The machine of claim 3 wherein the forming station has an upper mold portion which contacts the top of the post for each sheet stretching guide rail as the mold portion moves downwardly to thereby drive the post downwardly and drive the shaft and rail section connected thereto outwardly, and including a spring mounted to bias the post upwardly and into contact with the mold portion and further including a spring mounted to bias the shaft and guide rail connected thereto inwardly to the normal position of the guide rail.

5. The apparatus of claim 1 including additional stationary guide rails mounted on either side of the path of the plastic sheet which are mounted adjacent to the sheet stretching guide rails in position to receive the plastic sheet exiting from the sheet stretching guide rails, each of the additional stationary guide rails having a slot therein normally aligned with the slot in the adjacent sheet stretching guide rail, each of the additional stationary guide rails having walls defining an internal cavity opening on the slot therein which is normally aligned with the internal cavity in the adjacent sheet stretching guide rail.

* * * * *